United States Patent [19]

Hirano et al.

[11] Patent Number: 4,710,033

[45] Date of Patent: Dec. 1, 1987

[54] TEMPERATURE MEASUREMENT SYSTEM

[75] Inventors: Masao Hirano, Takatsuki; Mitsutaka Kato; Hirohiko Yasuda, both of Kyoto; Seisuke Hinoda, Uji, all of Japan

[73] Assignee: Omron Tateisi Electronics Co., Kyoto, Japan

[21] Appl. No.: 738,512

[22] Filed: May 28, 1985

Related U.S. Application Data

[63] Continuation of Ser. No. 365,028, Apr. 2, 1982, abandoned.

[30] Foreign Application Priority Data

Apr. 7, 1981 [JP] Japan .................................. 56-51997

[51] Int. Cl.$^4$ ............................................. G01K 11/12
[52] U.S. Cl. .................................. 374/161; 250/458.1; 356/44
[58] Field of Search ..................... 356/43, 44, 317, 318; 250/458.1, 459.1; 374/131, 159, 161; 375/162

[56] References Cited

U.S. PATENT DOCUMENTS

| | | |
|---|---|---|
| 3,599,109 | 8/1971 | Guggenheim et al. ...... 250/458.1 X |
| 3,654,463 | 4/1972 | Geusic et al. .................... 250/458.1 |
| 4,043,860 | 8/1977 | Aucoin et al. ........... 252/301.4 P X |
| 4,047,033 | 9/1977 | Malmberg et al. .............. 250/458.1 |
| 4,198,567 | 4/1980 | Eneroth et al. ................. 356/318 X |
| 4,215,275 | 7/1980 | Wickersheim ......................... 356/44 |
| 4,223,226 | 9/1980 | Quick et al. ..................... 356/44 X |
| 4,245,507 | 1/1981 | Samulski .............................. 356/44 |

FOREIGN PATENT DOCUMENTS 2064107 6/1981 United Kingdom ............. 250/458.1

Primary Examiner—Vincent P. McGraw
Attorney, Agent, or Firm—Cushman, Darby & Cushman

[57] ABSTRACT

A fluorescent material arranged under an environment of temperature objective for measurement is excited by irradiating red color light or infrared rays, then fluorescent light generated from the fluorescent material is received by an optical sensor thus the temperature of the fluorescent material is measured from an output of the optical sensor on the basis of the correlation between a fluorescent characteristic of the fluorescent material and temperature.

2 Claims, 13 Drawing Figures

TEMPERATURE MEASUREMENT SYSTEM

This is a continuation of application Ser. No. 365,028, filed Apr. 2, 1982, which was abandoned upon the filing hereof.

BACKGROUND OF THE INVENTION

This invention relates to a photoelectrically operated temperature measurement system more particularly, to a system for measuring temperature by utilizing the fact that the fluorescence in a fluorescent material correlates with temperature.

It has been conventionally known that the characteristic of fluorescence in a fluorescent material correlates with temperature. In the past attempts have been made for measuring temperature photoelectrically by utilizing this quality of the fluorescent material. The conventional temperature measurement system is as follows.

A fluorescent material is disposed in a temperature environment for objective measurement. Ultraviolet rays are irradiated to this fluorescent material to cause its excitation. As a light source of excitation for emitting the ultraviolet rays, a halogen lamp is used, and only the ultraviolet rays of the light beams from the halogen lamp are selectively extracted by using an optical filter. Fluorescence emitted from the excited fluorescent material is received by an optical sensor and an electric signal corresponding to fluorescent intensity can be obtained from said optical sensor. The correlation between the fluorescent intensity from the above described fluorescent material under excitation and temperature had been previously obtained. On the basis of this correlation, temperature of the fluorescent material, that is, the objective measurement temperature can be calculated from output of the above described optical sensor.

In this way, the temperature measurement system using a fluorescent material remarkably differs from a purely electrical temperature measurement system generally using a thermistor or thermocouple and the like in that a transmission part (called detection-transmission part) for sampling the temperature is purely optically constituted. The detection-transmission part, being optically constituted, presents the desirable effect of noninfluence by electromagnetic noise and measurement can be performed without trouble even under an explosive or metal corrosive atmosphere.

However, the above described conventional temperature measurement system, relating to excitation of a fluorescent material with ultraviolet rays, has not been generally put in wide use for the following reasons.

In the past, excitation with ultraviolet rays has been applied because many fluorescent materials show very high efficient fluorescent action by the excitation of ultraviolet rays. In a present instance, the simplest easy source of ultraviolet rays is a combination of the above described halogen lamp and an optical filter. However using a halogen lamp as the source of excitation light causes many problems. A large amount of electric power consumption is necessary for a halogen lamp. A large amount of heat being generated from the lamp requires heat dissipating measures. Accordingly, the light source becomes very large in size and not suitable for long time use. Use of an optical fiber is not suitable for the light transmission device to guide ultraviolet rays from the lamp to the fluorescent material. Use of an optical fiber increases the flexability of use and is preferable also from the standpoint of noise resistance and corrosion resistance. On the contrary, as well known, a large amount of transmission loss of ultraviolet rays is inevitable in an optical fiber, and if ultraviolet rays of high energy are emitted through an optical fiber for a long time, the optical fiber undergoes a change in its glass composition resulting in coloring and deterioration of permeability. Further it is difficult to efficiently introduce widely dispersed light from the halogen lamp to a fine optical fiber. Thus, it is very difficult to irradiate ultraviolet rays from a halogen lamp efficiently to the fluorescent material through an optical fiber, and accordingly an optical fiber could not be used.

BRIEF SUMMARY OF THE INVENTION

It is an object of this invention to provide a temperature measurement system of simple and highly practical constitution with excitation of the fluorescent material by red light or infrared rays for accurately performing correct temperature measurement.

Another object of this invention is to provide a temperature measurement system uninfluenced by noise and corrosion and also with easy remote sensing by guiding excitation light for the fluorescent material through an optical fiber.

Another object of this invention is to provide a temperature measurement system with a miniature small power light source with no heat generation by using a red color or infrared light emitting diode for a source of excitation.

A further object of this invention is to provide a temperature measurement system capable of efficiently irradiating light from a source of excitation light to the fluorescent material and further capable of constituting a very easy to handle temperature measuring probe by optically coupling with an optical fiber the source of excitation light of red color or infrared light emitting diode and the fluorescent material.

A still further object of this invention is to provide a temperature measurement system capable of performing highly accurate measurement on the basis of various correlations between the fluorescent characteristic and temperature.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE INVENTION

Figure 1:
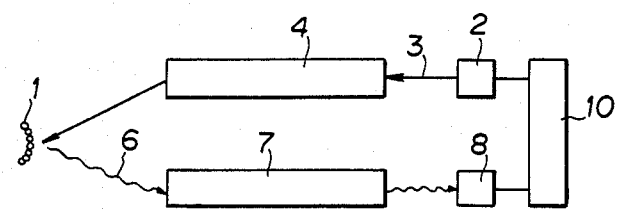
FIG. 1 is a view showing theoretical constitution of a temperature measurement system according to this invention.

Now referring to FIG. 1 a fluorescent material 1 is, for instance, dispersed into nitrocellulose and arranged in a measurement objective temperature environment at a temperature equal to that of a measured object. Excitation light 3 of red color light or infrared rays is emitted from an excitation light source 2, guided by a light transmission line 4 and irradiated to the above described fluorescent material 1. The fluorescent material 1 is excited by the red color light or infrared rays, then fluorescent light 6 generated from said material is guided to a light transmission line 7 and received by an optical sensor 8. At an incidence side of the optical sensor 8 an optical filter for selectively extracting the fluorescent light 6 is arranged as necessary. The above described excitation light source 2 is pulse driven as described later by a control signal from a signal processing circuit 10, to generate the excitation light as a pulse. An output signal of the optical sensor 8 is applied to the above described signal processing circuit 10, synchronized with drive timing of the above described excitation light source 2 and signal processed to obtain the temperature of the fluorescent material 1.

For the above described fluorescent material 1, many kinds of fluorescent materials excited by red color light or infrared rays can be used. For instance, fluorescent material of anti-stokes luminescence, include those containing as an active substance at least one of the rare earth elements of Yb, Er, Tm, Ho and containing as the parent substance at least one of the rare earth fluorides of $GdF_3$, $LaF_3$, $YF_3$, $LuF_3$ or the alkaline earth metal element fluorides of $CaF_2$, $BaF_2$, $BaYF_5$, $NaLuF_4$ and/or $Y_3OCl_7$.

As a fluorescent material of stoke luminescence $NdP_5O_{14}$ or $Li(Nd, Yb)P_4O_{12}$ can be used.

Figure 2A:
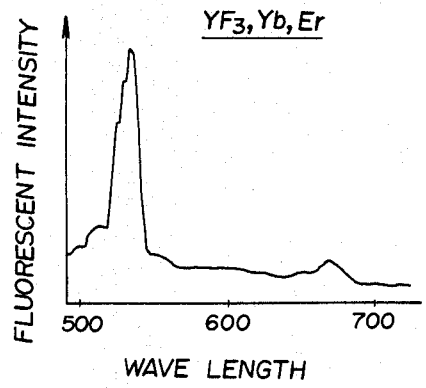
FIGS. 2(A) and 2(B) are views showing characteristic curves of fluorescent spectrum in an example of the fluorescent material applied to this invention.

As an excitation light source for the former anti-stokes fluorescent material, an infrared light emitting diode constituted by a semiconductor of Si dope GaAs is suitable. The luminous light wave length of this infrared light emitting diode is 950 nm. FIG. 2(A) is a view showing a fluorescent spectrum characteristic curve for exciting a fluorescent material consisting of $YF_3$; Yb, Er with infrared wave length of 950 nm. This fluorescent material ($YF_3$; Yb,Er) shows a large peak of fluorescent intensity for excitation light of wave length of about 980 nm, and accordingly shows large fluorescent action also for excitation light of wave length of 950 nm from the above described Si dope GaAs light emitting diode.

Figure 2B:
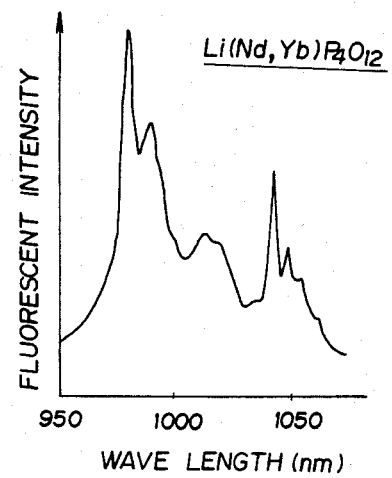

As an excitation light source for the latter stokes fluorescent material, a red color light emitting diode constituted by GaAs semiconductor is suitable. The luminous light wave length of this red color light emitting diode is 800 nm. FIG. 2(B) is a view showing a fluorescent spectrum characteristic curve for exciting a fluorescent material consisting of $Li(Nd, Yb)P_4O_{12}$ with red color light of wave length of 800 nm.

The above described two kinds of light emitting diode are generally in wide supply at present and procurable at low cost.

Figure 3A:
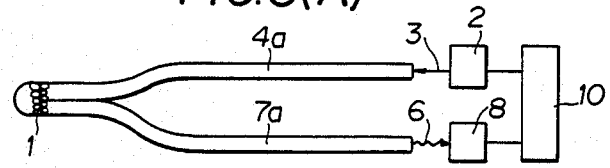
FIGS. 3(A) and 3(B) are views showing a temperature measurement system according to the invention constituted by using an optical fiber.

For the light transmission line 4 of the above described excitation light 3 and the light transmission line 7 of the fluorescent light 6, use of an optical fiber is preferable. FIGS. 3(A), (B) are views showing examples used with an optical fiber. For the example shown by the FIG. 3(A), an optical fiber 4a for excitation light transmission and an optical fiber 7a for fluorescent light transmission are used. The end parts of the both fibers 4a, 7a are bound in parallel, and to their end part is secured the fluorescent material 1 dispersed in a suitable binder. The excitation light source 2 consisting of a light emitting diode is optically coupled to the other end of the optical fiber 4a, and the optical sensor 8 is optically coupled to the other end of the optical fiber 7a.

Figure 3B:
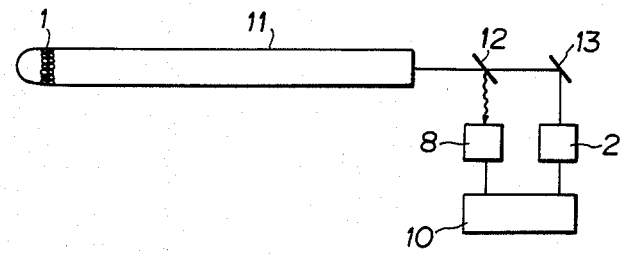

An example in FIG. 3(B) is to combine the excitation transmission line of the fluorescent light with one optical fiber 11. To the point end face of the optical fiber 11 the fluorescent material 1 is secured similarly in the above described manner. The light 3 from the excitation light source 2 consisting of a light emitting diode is reflected by a mirror 13 passing through a half mirror 12 and is introduced to the optical fiber 11 irradiate to the fluorescent material 1. The fluorescent light 6 generated from the fluorescent material 1 is guided to the optical fiber 11, reflected by the above described half mirror 12 and received by the optical sensor 8.

In the above, the excitation light 3 from the excitation light source 2 can be very efficiently irradiated to the fluorescent material 1 and simultaneously the fluorescent light 6 generated from the fluorescent material 1 can be very efficiently guided to the optical sensor 8. Further an optical fiber used as the light transmission line is flexible and freely arrangeable with easy remote sensing and excellent noise and corrosion resistance.

Figure 4A:
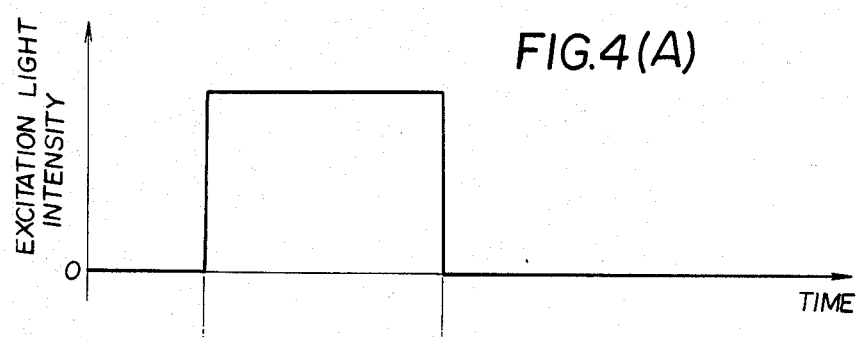
FIGS. 4(A) and 4(B) are views showing intensity change waveforms of excitation light and fluorescent light.
Figure 4B:
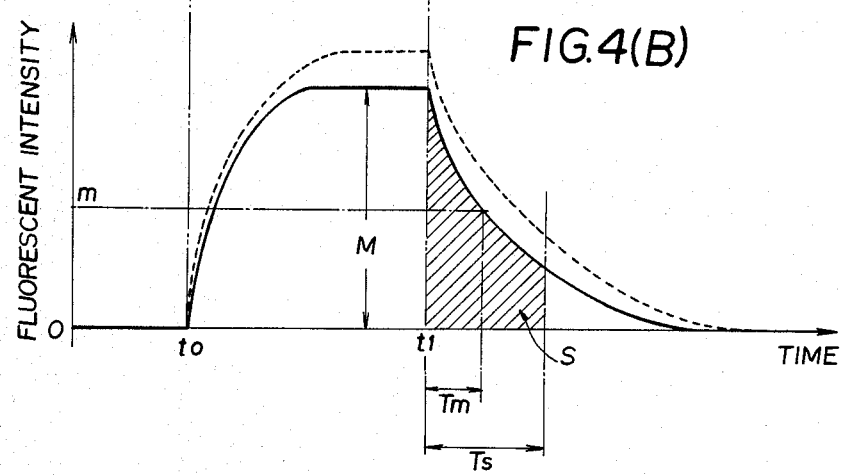

FIG. 4(A) is a view showing a waveform of intensity change for the excitation light 3 from the excitation light source 2 pulse driven as described in the above, and FIG. 4(B) is a view showing a waveform of intensity change for the fluorescent light 6 generated from the fluorescent material 1 by irradiation of said excitation light pulse. As shown in FIG. 4, the intensity of the fluorescent light 6 exponentially functionally increases from an excitation start point (t0) and is saturated at a certain point, and then exponential functionally decreases from an excitation stop point (t1). Fluorescent light after this excitation stop is called an afterglow. An electrical signal as shown in FIG. 4(B) is the output from optical sensor 8.

In accordance with the temperature of the fluorescent material 1, the intensity change waveform of the fluorescent light 6 changes shape as shown by a dotted line in FIG. 4(B). Correlation of this fluorescent characteristic with temperature clearly exists.

Figure 5A:
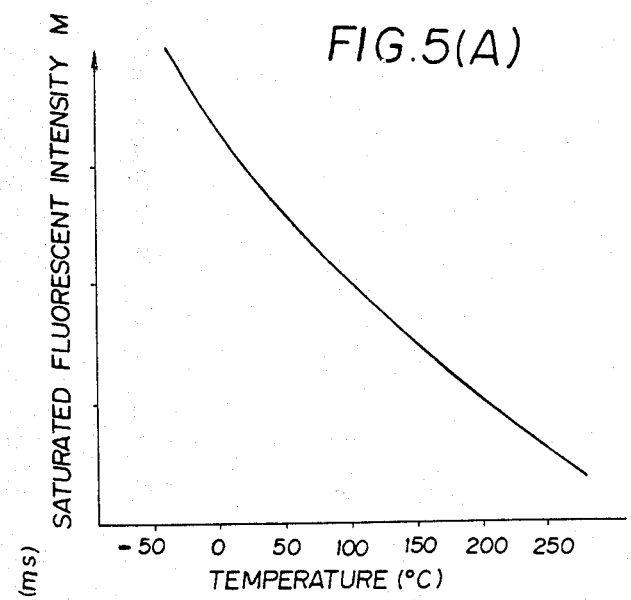
FIGS. 5(A), 5(B) and 5(C) are views showing graphs of correlation between fluorescence and temperature.
Figure 6A:
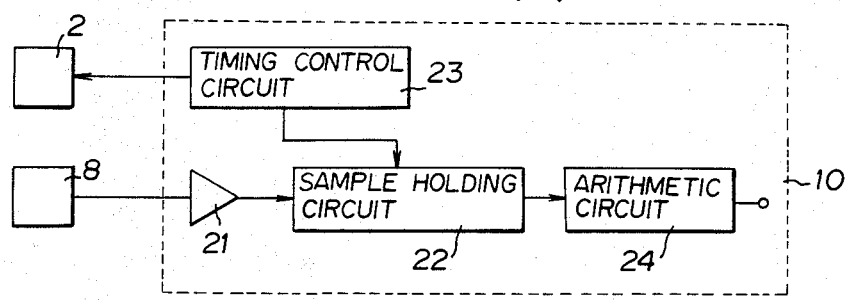
FIGS. 6(A), 6(B) and 6(C) are block diagrams showing three examples of a signal processing circuit.

The first is a saturated value M of fluorescent intensity during excitation. FIG. 5(A) is a view showing the correlation between temperature of the fluorescent material ($YF_3$; Yb, Er) and the above described saturated fluorescent intensity M. As obviously shown from this FIG. the saturated fluorescent light intensity M, if detected, can be used to obtain the temperature. FIG. 6(A) shows an example of the signal processing circuit 10 in that case. In short, an output signal of the optical sensor 8 is amplified by a preamplifier 21 and applied to a sample holding ciruit 22. To the sample holding circuit 22 a control signal is applied at a prescribed time immediately before the excitation stop from a timing control circuit 23 and synchronously with a drive signal of the above described excitation light source 2. In this way, a signal level corresponding to the above described saturated fluorescent light intensity M is held by the sample holding circuit 22 and its signal is converted into temperature in an arithmetic circuit 24. The above operation is repeated cyclically to perform continuous temperature measurement.

Figure 5B:
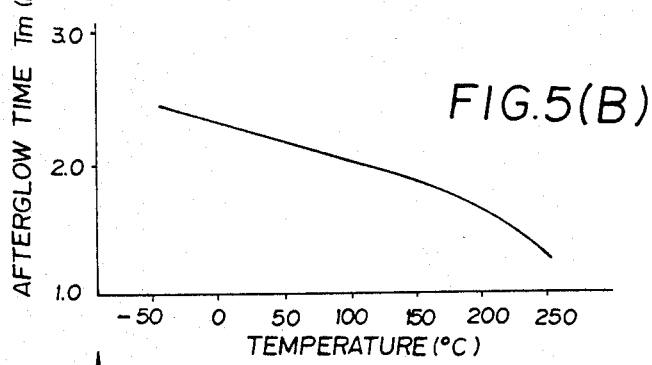
Figure 6B:
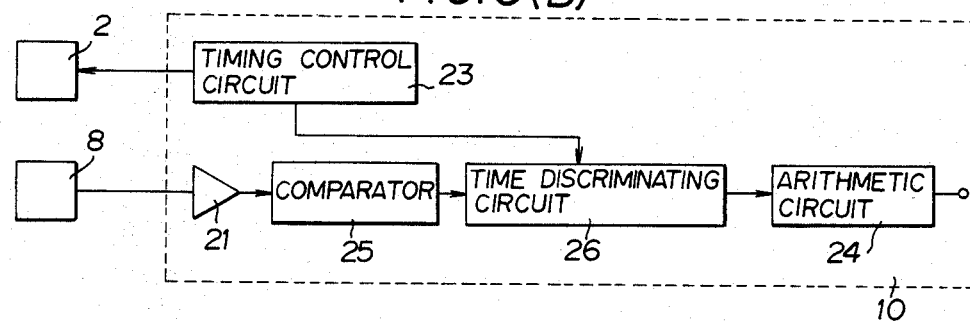

The second is a time Tm from the excitation stop time (t1) to the time for the fluorescent light intensity to decrease to a prescribed threshold value m. This time Tm is called afterglow time. FIG. 5(B) shows the correlation between temperature of the fluorescent material (YF$_3$; Yb, Er) and the above described afterglow time Tm. As obviously shown by the FIG. the afterglow time Tm, if measured, can yield temperature. FIG. 6(B) shows an example of the signal processing circuit 10 in that case. In short, an output signal of the optical sensor 8, after being amplified by a preamplifier 21, is level discriminated in a comparator 25 with a corresponding value to the above described threshold value m. A time discriminating circuit 26 measures the time Tm from the reception of an excitation stop timing signal from the timing control circuit 23 to the input of a discimination signal from the above described comparator 25, and outputs a signal of a level corresponding to said time Tm. The singal is converted into temperature by the arithmetic circuit 24. The above mentioned operation is repeated cyclically.

Figure 5C:
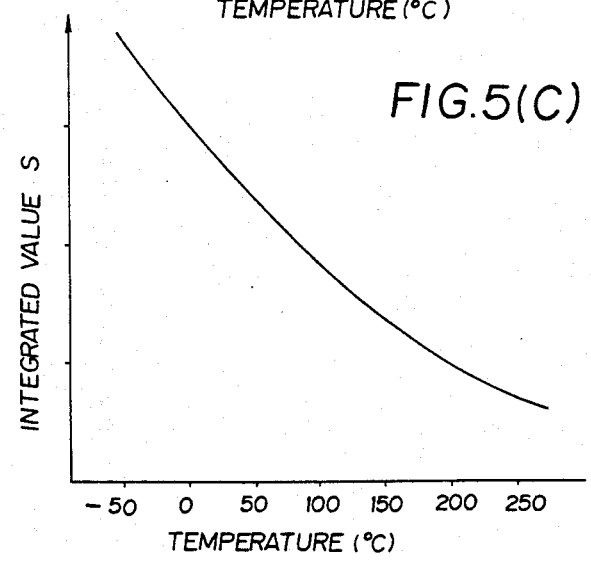
Figure 6C:
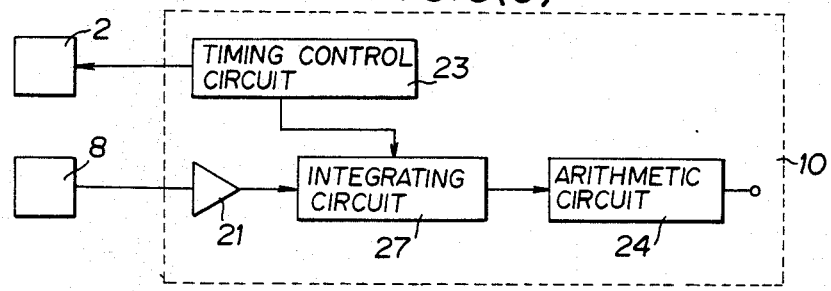

The third is an integrated value S of fluorescent light intensity in a certain time Ts after excitation stop. This integrated value S corresponds to the area of a portion shown by a slash in FIG. 4(B). FIG. 5(C) is a view showing the correlation between temperature of the fluorescent material (GdF$_3$; Yb, Er) and the above described integrated value S. As obviously shown by this FIG. if the above described integrated value S is measured, temperature can be obtained. FIG. 6(C) shows an example of the signal processing circuit 10 in that case. In short, an output signal of the optical sensor 8 is amplified by the preamplifier 21 and applied to an integrating circuit 27. This integrating circuit 27 receives a control signal from the timing control circuit 23 to perform an integrating operation by the certain time Ts after the stop of excitation. As a result, a signal of level corresponding to the above described integrated value S is produced by the integrating circuit 27 and converted into temperature in the arithmetic circuit 24. The above mentioned operation is repeated cyclically.

In the second and the third methods as described above, where substantial measurement is performed after the stop of excitation, since the excitation light 3 and the fluorescent light 6 are separated in point of the time, measurement can done with high accuracy and without being badly affected by the excitation light 3. If measurement is repeatedly performed in a constant period to average the obtained measured value with respect to plural periods, an accurate measurement value can be obtained with extremely little influence by noise.

As many apparently widely different embodiments of this invention may be made without departing from the spirit and scope thereof, it is to be understood that the invention is not limited to the specific embodiments thereof except as defined in the appended claims.

What we claim is:

1. A temperature measurement system comprising:
   a phosphorescent material adapted for placement in an environment the temperature of which is to be measured, said material including one of the active rare earth substances chosen from the group consisting of Yb, Er, Tm, and Ho and one of the parent substances chosen from the group consisting of GdF$_3$, LaF$_3$, YF$_3$, LuF$_3$, CaF$_2$, BaF$_2$, BaYF$_5$, NaLuF$_4$ and Y$_3$OCl$_7$;
   means for exciting said material to emit phosphorescent light, said exciting means comprising a light emitting diode for irradiating said material with infrared radiation to excite said material;
   means for receiving emitted light and detecting the intensity thereof; and
   means for integrating the value of intensity for a given time only following cessation of excitation to determine said temperature.

2. A temperature measurement system comprising:
   a phosphorescent material adapted for placement in an environment the temperature of which is to be measured, said material chosen from the group consisting of NdP$_5$O$_{14}$, and Li(Nd, Yb)P$_4$O$_{12}$;
   means for exciting said material to emit phosphorescent light, said exciting means comprising a light emitting diode for irradiating said material with infrared radiation to excite said material;
   means for receiving emitted light and detecting the intensity thereof; and
   means for integrating the value of intensity for a given time only following cessation of excitation to determine said temperature.

* * * * *